US009026761B2

(12) United States Patent
Mangano et al.

(10) Patent No.: US 9,026,761 B2
(45) Date of Patent: May 5, 2015

(54) INTERFACE SYSTEM, AND CORRESPONDING INTEGRATED CIRCUIT AND METHOD

(75) Inventors: Daniele Mangano, Messina (IT); Salvatore Pisasale, Catania (IT); Ignazio Antonino Urzi', Voreppe (FR)

(73) Assignees: STMicroelectronics (Grenoble 2) SAS, Grenoble (FR); STMicroelectronics S.R.L., Agrate Brianza (MB) (IT)

( * ) Notice: Subject to any disclaimer, the term of this patent is extended or adjusted under 35 U.S.C. 154(b) by 132 days.

(21) Appl. No.: 13/324,838

(22) Filed: Dec. 13, 2011

(65) Prior Publication Data
US 2012/0159095 A1 Jun. 21, 2012

(30) Foreign Application Priority Data

Dec. 20, 2010 (IT) .............................. TO2010A1017
Jan. 24, 2011 (IT) .............................. TO2011A0050

(51) Int. Cl.
*G06F 12/00* (2006.01)
*G06F 13/40* (2006.01)
*G06F 13/16* (2006.01)
*G06F 13/364* (2006.01)
(Continued)

(52) U.S. Cl.
CPC ........ *G06F 13/4059* (2013.01); *G06F 13/1673* (2013.01); *G06F 13/364* (2013.01); *G06F 1/12* (2013.01); *G06F 13/42* (2013.01); *G06F 13/1689* (2013.01)

(58) Field of Classification Search
CPC . G06F 13/4027; G06F 2205/102; G06F 5/10; G06F 5/14; G06F 3/0614; G06F 13/4059; G06F 1/12; G06F 13/385; G06F 5/06; G06F 5/12; G06F 13/1689; G06F 13/1673; G06F 13/364; G11C 11/419; G11C 7/1093; G11C 7/222
USPC .................................................. 711/167, 154
See application file for complete search history.

(56) References Cited

U.S. PATENT DOCUMENTS

| 6,263,410 | B1 | 7/2001 | Kao et al. |
| 6,611,884 | B2 * | 8/2003 | Castellano ...................... 710/29 |
| 6,941,433 | B1 * | 9/2005 | Libby et al. ................... 711/167 |

(Continued)

OTHER PUBLICATIONS

Italian Search report for ITTO20110050, mailed Jun. 21, 2011, pp. 8.
(Continued)

*Primary Examiner* — Hashem Farrokh
(74) *Attorney, Agent, or Firm* — Allen, Dyer, Doppelt, Milbrath & Gilchrist, P.A.

(57) ABSTRACT

An interface system for interfacing an asynchronous circuit with a synchronous circuit, wherein the synchronous circuit samples, in response to a clock signal, a first data signal when a first control signal indicates that the first data signal contains valid data, and wherein the asynchronous circuit generates a second data signal according to an asynchronous communication protocol. The system includes a FIFO memory, a control circuit for asynchronously writing the second data signal in the memory when the second data signal indicates the start of a communication, and synchronously reading the second data signal from the memory in response to a clock signal, and a conversion circuit for decoding, according to a asynchronous communication protocol, the second data signal read from the memory in a decoded data signal, wherein the decoded data signal corresponds to the first data signal.

15 Claims, 4 Drawing Sheets

(51) Int. Cl.
*G06F 13/42* (2006.01)
*G06F 1/12* (2006.01)

(56) References Cited

U.S. PATENT DOCUMENTS

| | | |
|---|---|---|
| 7,519,759 B2 | 4/2009 | Kessels et al. |
| 7,519,788 B2* | 4/2009 | LaBerge .................. 711/167 |
| 7,669,004 B2* | 2/2010 | Lin et al. .................. 711/103 |
| 7,925,803 B2 | 4/2011 | Mangano et al. |
| 2003/0165158 A1* | 9/2003 | Davies et al. ............... 370/465 |
| 2004/0128413 A1 | 7/2004 | Chelcea et al. |
| 2006/0041693 A1 | 2/2006 | Mangano et al. |
| 2007/0038795 A1 | 2/2007 | Kadomaru |
| 2008/0123765 A1 | 5/2008 | Oh et al. |
| 2009/0037619 A1* | 2/2009 | Fan et al. .................. 710/55 |
| 2011/0116337 A1* | 5/2011 | Hay et al. ................. 365/233.11 |

OTHER PUBLICATIONS

European Search Report, Application No. EP 11 19 2731, received Feb. 17, 2012.
European Search Report, Application No. EP 11 19 3208, received Feb. 21, 2012.
European Search Report, Application No. EP 11 19 3192, received Feb. 17, 2012.
European Search Report, Application No. IT TO20101017, date of printing Jun. 21, 2011.
European Search Report, Application No. IT TO20110049, date of printing Jun. 21, 2011.
Campobello et al., GALS Networks on Chip: A New Solution for Asynchronous Delay-Insensitive Links, 2006 EDAA, 6 pgs.
Moore et al., Point to Point GALS Interconnect, 2002 IEEE, 7 pgs.

* cited by examiner

INTERFACE SYSTEM, AND CORRESPONDING INTEGRATED CIRCUIT AND METHOD

RELATED APPLICATIONS

The present application claims priority of Italian Application Nos. TO2010A001017 filed Dec. 20, 2010 and TO2011A000050 filed Jan. 24, 2011, both of which are incorporated herein by reference in their entirety and are assigned to the assignee of the present application.

FIELD OF THE INVENTION

The present invention relates to interfacing systems and methods.

The invention has been developed with particular attention paid to its possible use for interfacing an asynchronous-communication interface with a synchronous-communication interface.

DESCRIPTION OF THE PRIOR ART

The possibility of using for interconnection communications within an integrated circuit asynchronous communications becomes increasingly more expedient for mitigating the effects of deep-submicron technologies. In fact, said asynchronous communications present the advantage that the communication is delay-insensitive (DI).

For this purpose, the asynchronous-communication system is frequently required to be interfaced with components comprising a synchronous-communication interface, i.e., a communication interface in which the communication signals are synchronized with a clock signal. For example, this problem frequently exists in systems within an integrated circuit (System-on-Chip or SoC), such as for example circuits to be used for mobile or multimedia applications, in which various Intellectual Property (IP) circuits are connected together to form complex systems. Hence, in general asynchronous-communication systems of this sort can include both systems without clock signal and systems of the multiclock or "globally asynchronous locally synchronous" (GALS) type.

For example, FIG. 1a is a schematic illustration of a possible synchronous communication diagram based on a two-phase signaling protocol; i.e., the communication is synchronized with a clock signal CLOCK, for example, with the rising edge of the signal CLOCK.

In this case, a first control signal REQ is used for signaling that data are available on a DATA bus (i.e., the data are valid), and a second control signal ACK is used for signaling that the receiver component has been able to sample the data DATA.

In particular, to indicate that no new data are available on the bus DATA, the signal REQ has a first logic value, such as, for example, the logic level '0'; i.e., this condition corresponds to an initial phase referred to as RESET. However, in the case where a number of data must be transferred consecutively at the maximum speed, the signals REQ and ACK could also remain always high.

Instead, when new data are available on the DATA bus (phase FS1), the transmitter component changes, at an instant $t_1$, the logic value of the signal REQ; for example, it changes the logic level from '0' to '1'.

However, due to propagation delays, this change is not immediately detectable, and the receiver component can detect said change of the signal REQ only with the next rising edge of the signal CLOCK, i.e., at an instant $t_2$.

Once the change of the signal REQ (phase FA2) has been detected, the receiver component samples the data on the bus DATA and acknowledges that the data have been read; i.e., the receiver component changes at the instant $t_2$ the logic value of the signal ACK, for example changes the logic level from '0' to '1'.

Again, said change is detectable only at the next clock cycle, i.e., at an instant $t_3$.

Consequently, when the transmitter component detects the change of the logic value of the signal ACK at instant $t_3$, the transmission has gone through successfully and both of the components return to the initial condition, i.e., the RESET condition.

Said communication is synchronous, because, for generating and sampling the control signals REQ and ACK, both of the components use the same clock signal, i.e., clock signals that have the same frequency.

Instead, asynchronous circuits are frequently based upon a signaling protocol comprising four "handshaking" phases. In this case, the delay insensitivity is obtained via a particular encoding of the data; namely, the validity of the data can be recognized also from the data themselves.

For example, FIG. 1b shows a communication timing diagram based upon a four-phase signaling protocol, where the signal on a bus ADATA itself signals start of a new communication. In this case, a signal AACK is in any case convenient for signaling the fact that the receiver component has been able to sample the data.

In particular, also in this case, both the transmitter component and the receiver component are in an initial condition referred to as RESET.

However, for signaling the start and end of a communication, the signal on the bus ADATA is used directly. For example, typical four-phase protocols are the "Dual-Rail" or "1-of-N" protocols.

For example, to transmit the logic value '0' (phase FA1), it is possible to transmit actually at an instant $t_4$ the sequence of bits "01" on two different lines. In a substantially similar way, to transmit the logic value '1' it is possible to transmit actually the sequence of bits "10".

The receiver component detects said signal on the bus ADATA and acknowledges that reading has been performed (phase FA2); i.e., the logic value of the signal AACK changes; for example, the logic level changes from '0' to '1'.

Consequently, the transmitter component detects the change of the signal AACK at an instant $t_5$, and the transmitter component signals the end of the communication at an instant $t_6$ (phase FA3). For instance, to signal the end of the communication, the transmitter component can transmit the sequence of bits "00".

Finally, said sequence of bits is detected by the receiver component, and also this returns to the initial condition; i.e., the receiver component again changes the logic value of the signal AACK.

The transmitter component can detect said change at an instant $t_7$ and terminate the communication (phase FA4).

Hence, a four-phase protocol can also be detected in an asynchronous way, i.e., at any moment.

SUMMARY OF THE INVENTION

The object of the invention is to interface an asynchronous circuit with a synchronous circuit.

In fact, the inventors have noted that the way in which the interface operations are carried out is of considerable importance to prevent long delays in the exchange of information.

With a view to achieving the aforesaid object, the subject of the invention is an interface system having the characteristics specified in claim 1. The invention also regards a corresponding integrated circuit and a corresponding method. Further advantageous characteristics of the invention form the subject of the dependent claims.

The claims form an integral part of the technical teaching provided herein in relation to the invention.

Various embodiments described herein refer to solutions that enable interfacing of an asynchronous circuit with a synchronous circuit.

According to the solution described herein, the interface system is configured for writing the data received from the asynchronous circuit in a First-In First-Out (FIFO) memory. In particular, said writing is performed asynchronously. Instead, reading of the data from the FIFO memory is performed synchronously in response to a clock signal received from the synchronous circuit.

In various embodiments, before transmitting the data read from the FIFO memory of the synchronous circuit, such data are decoded according to the asynchronous communication protocol used by the asynchronous circuit.

BRIEF DESCRIPTION OF THE DRAWINGS

The invention will now be described purely by way of non-limiting example with reference to the annexed drawings, in which.

DETAILED DESCRIPTION

Illustrated in the ensuing description are various specific details aimed at an in-depth understanding of the embodiments. The embodiments can be provided without one or more of the specific details, or with other methods, components, materials, etc. In other cases, known structures, materials, or operations are not shown or described in detail to prevent various aspects of the embodiments from being obscured.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. In addition, particular conformations, structures, or characteristics can be combined in any adequate way in one or more embodiments.

The references used herein are only provided for convenience and hence do not define the sphere of protection or the scope of the embodiments.

As mentioned previously, the object of the invention is that of providing an interface system for connecting an asynchronous circuit to a synchronous circuit.

Figure 2:
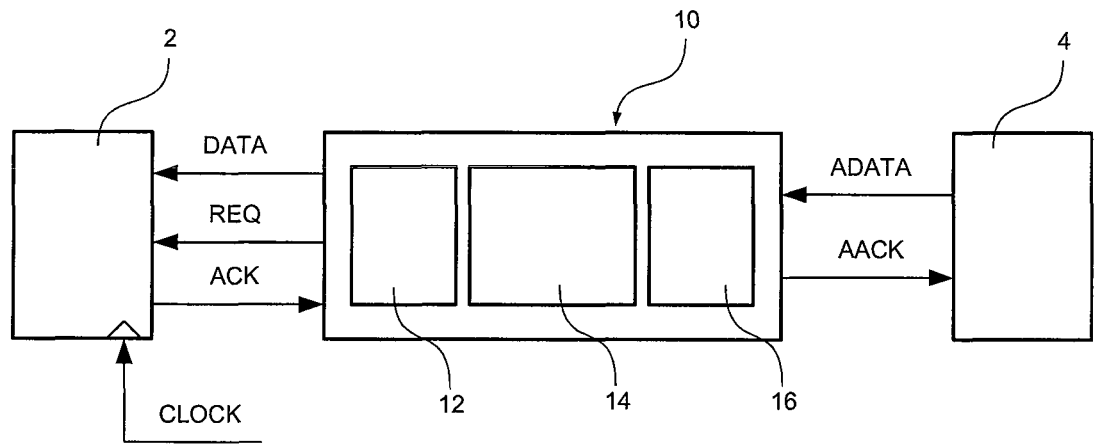
FIG. 2 is a block diagram of a generic interface system.

FIG. 2 shows one possible embodiment of a generic interface system 10 configured for interfacing an asynchronous system 4 with a synchronous component 2.

In particular, in the embodiment considered, the component 2 uses a two-phase synchronous communication protocol, i.e., the circuit 2 comprises a communication interface configured for synchronously sampling a signal DATA, i.e., in response to a clock signal CLOCK, when a signal REQ indicates that the data signal DATA contains valid data.

In the embodiment considered, the communication interface of component 2 is configured for generating an ACK signal at output indicating that the data signal DATA was sampled.

In the embodiment considered, the system 4 instead uses a four-phase asynchronous communication protocol, i.e., system 4 comprises a communication interface configured for generating a data signal ADATA, in which the data signal itself signals the start and the end of a communication.

In the embodiment considered, the communication interface of system 2 is configured for receiving a signal AACK indicating that the data signal ADATA was sampled.

In the embodiment shown in FIG. 2, to interface the synchronous component 2 with the asynchronous system 4, the interface system 10 comprises:

a first sub-circuit 12 configured for receiving the data from system 4 and decoding the data according to the specific asynchronous protocol used;

a second sub-circuit 14 configured for converting the four-phase signaling protocol into a two-phase signaling protocol; and a third sub-circuit 16 configured for synchronizing the control signals between the system 4 and the component 2.

In this context, the inventors have noted that the way in which these operations are carried out is of considerable importance to prevent long delays in the communication.

The inventors have also noted that the performance of the interface system 10 can be optimized using a First-In First-Out (FIFO) memory for decoupling the synchronous and asynchronous interfaces.

In particular, to provide a self-timed interface system with maximum data transfer, it is necessary that said FIFO memory be written asynchronously and read synchronously. This means, the asynchronous interface operates in parallel to the synchronous one, avoiding possible latencies caused by synchronization of control signals and/or by processing of the four-phase protocol, i.e., no synchronous signal is used to directly drive a signal of the asynchronous interface.

Figure 3:
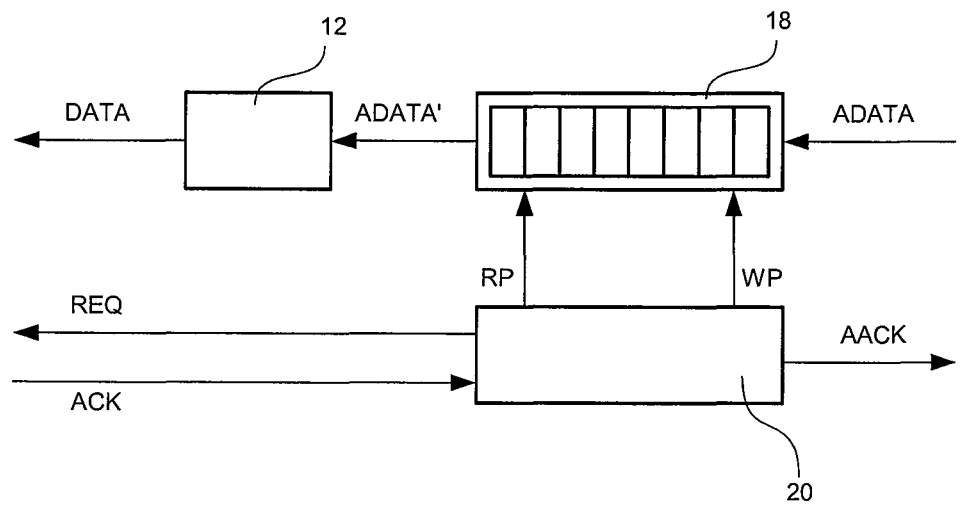
FIG. 3 shows one possible embodiment of an interface system.

FIG. 3 shows a possible embodiment of one such interface system 10.

In the embodiment considered, the system 10 receives a data signal ADATA from the asynchronous system 4 and, to acknowledge that the data have been received, the system 10 generates an asynchronous read-acknowledge signal AACK.

Next, the system 10 converts the data received from system 4 and transmits it to the synchronous circuit 2.

In particular, to handle communication between the circuits 2 and 4, the system 10 comprises a FIFO memory 18, in which the current write and read locations are indicated respectively via a write pointer WP and a read pointer RP.

In the embodiment considered, writing of the data ADATA in the FIFO memory 18 is controlled via a control circuit 20 that manages the write pointer WP as a function of the data signal ADATA. For example, in the embodiment considered, the write pointer WP is incremented when valid data are detected on the line ADATA (phase FA1 in FIG. 1b).

At the same time the logic value of the signal AACK can be changed to acknowledge writing of the data ADATA to the FIFO memory 18 (phase FA2). Next, when the line ADATA indicates the end of transmission (phase FA3), the logic value of the signal AACK is changed again (phase FA4).

The control circuit 20 is also responsible for reading the data from the FIFO memory 18. In particular, in the embodiment considered, the circuit 20 monitors the state of the FIFO memory 18, and when new data are available, the circuit increments the read pointer and reads said data ADATA' from the FIFO memory 18. In particular, in the embodiment considered, such reading is carried out synchronously; i.e., in response to clock signals from the synchronous circuit 2.

Preferably, the circuit 20 is also configured for changing the logic value of the line REQ to indicate that new data are available.

In addition, the system comprises a circuit 12, such as for example a combinatorial circuit, that converts the data read from the FIFO memory 18, i.e., the ADATA' data, and provides decoded data at output. In particular, the circuit 12 is configured for decoding the data ADATA' according to the specific asynchronous protocol used by circuit 4.

Finally, when the circuit 20 detects a change in the logic value of the signal ACK (phase FS2 in FIG. 1a), the circuit 20 can terminate the transmission.

Thus the circuit 20 described previously, periodically monitors the state of the FIFO memory 18 and, when new data are available in the FIFO memory 18, such data are transmitted immediately to the synchronous circuit 2.

In one embodiment, in order to prevent possible glitches on the asynchronous interface, the logic circuits used for selecting the memory locations within the FIFO memory use Gray encoding.

Figure 4:
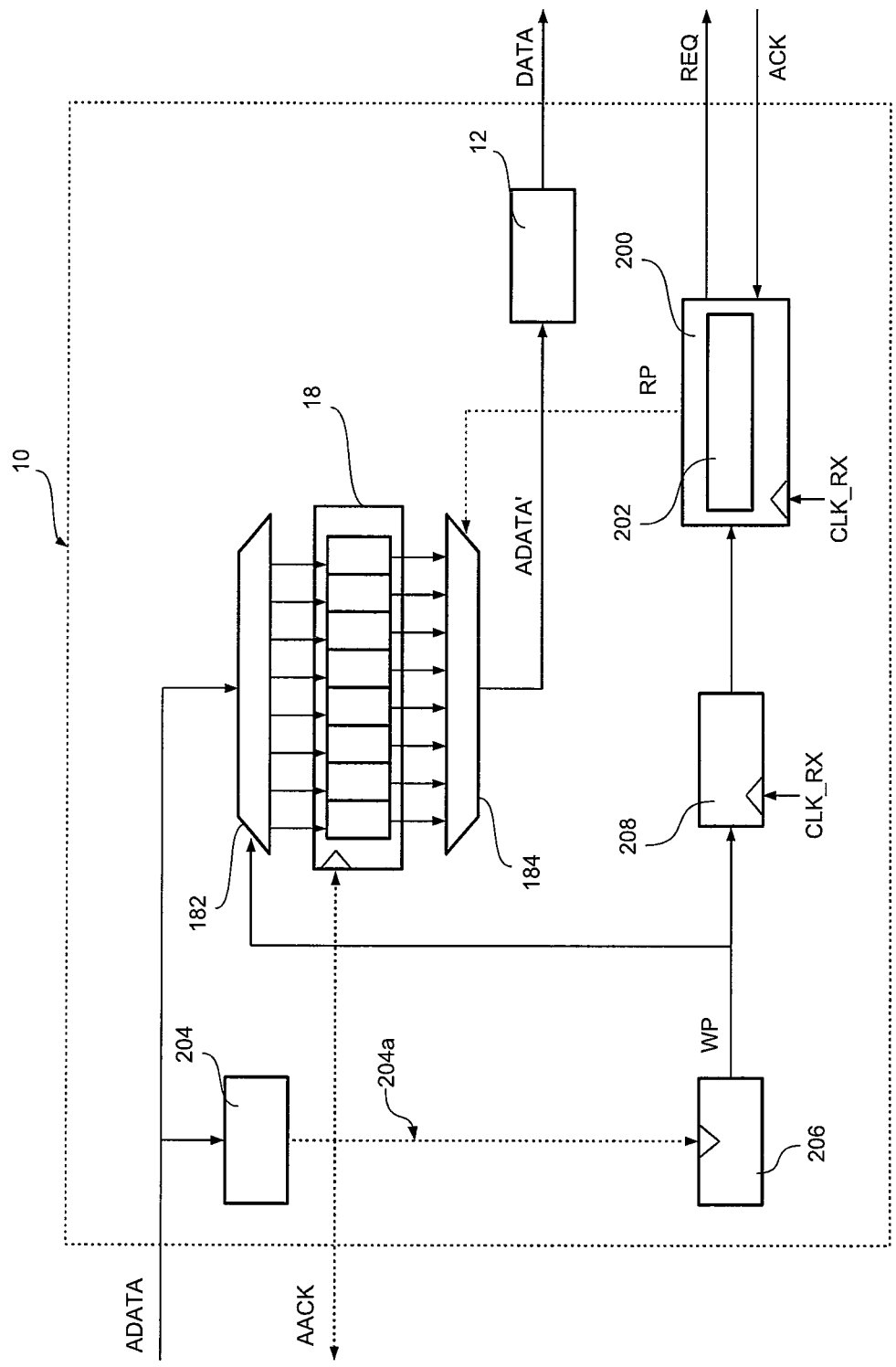
FIGS. 4 and 5 show possible embodiments of operation of the interface system in FIG. 3.

For example, FIG. 4 shows a possible embodiment of the conversion system 10, in which Gray encoding can also be used.

In the embodiment considered, the system comprises a FIFO memory 18, in which writing is carried out asynchronously, i.e., in response to the contents of the signal ADATA and reading is carried out synchronously with a clock signal CLK_RX, i.e., the clock signal of the synchronous component 2 that receives data.

Also in this case, the system 10 comprises a circuit 12 for implementing delay-insensitive decoding. In particular, the block 12 receives at input the data ADATA' read from the FIFO memory 18 and supplies at output decoded data that are transmitted directly on bus DATA. In general, the solution described here can be applied to any delay-insensitive encoding, and the input data DATA can include both data and control signals, for example of known communication protocols for integrated circuits, such as, for example, the protocols Advanced eXtensible Interface (AXI), STBus, Open Core Protocol International Partnership (OCP-IP).

For example, in the embodiment considered, the control circuit of the interface system 10 comprises a first circuit 204 configured for changing the logic value of a signal 204a when valid data are detected on the line ADATA. In general, implementation of said circuit 204 depends on the specific asynchronous protocol used. Still, such circuit must guarantee that the logic values of the signal 204a is changed only when the data signal ADATA is stable.

Figure 1:
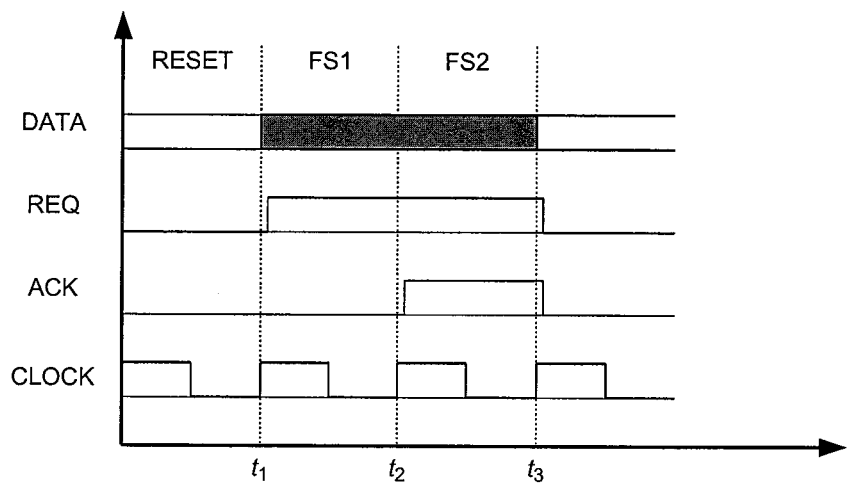
FIGS. 1a and 1b have already been described previously with respect to the prior art.
Figure 1:
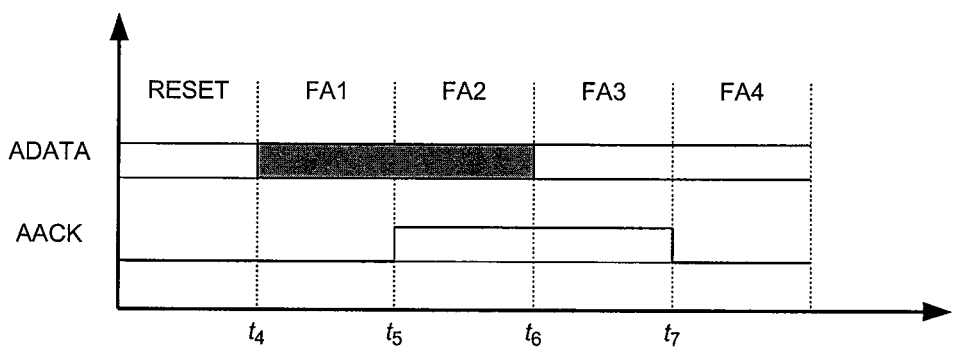

For example, for the exemplary case shown in FIG. 1b, the logic value of the signal 204a is set to '1' when the line ADATA contains valid data, and is set again to '0' when all the signals of the line ADATA are set to '0' (return-to-zero).

In the embodiment considered, said signal 204a is used to save the data on the line ADATA in the FIFO memory 18. In particular, in the embodiment considered, said signal is used as a clock signal for writing the data in the FIFO memory.

In the embodiment considered, said signal 204a is used also for incrementing the write pointer WP. For example in the embodiment considered, the write pointer WP is generated by means of a counter 206, such as for example a counter with Gray encoding, that is autonomously reset when the value of the counter 206 reaches the total number of memory location of the FIFO memory 18. In this case, the signal 204a can be used as a clock signal for the counter 206, i.e., the counter (and consequently also the write pointer WP) is incremented when valid data are detected on the line ADATA.

Finally, the signal 204a can also be used to acknowledge reading of the data. For example, in the embodiment considered, the signal 204a is used directly as a signal AACK. The person skilled in the art will appreciate that the operation described previously can also operate when the logic values of the various signals are inverted, for example in the case where the asynchronous circuit 4 uses an active-low signaling protocol.

In the embodiment considered, the control circuit comprises also a circuit 200 configured for managing the synchronous communication with the component 2 and for generating a read pointer RP.

For example, in the embodiment considered, the circuit 200 comprises a block 202 dedicated to generate the read pointer RP, in which the block 202 is configured for incrementing the read pointer RP synchronously when new data are available in the FIFO memory 18. For example, the circuit 202 can be obtained by means of a counter, such as for example a counter with Gray encoding.

In addition, for detecting the presence of new data in the FIFO memory 18, the write pointer WP can be compared with the read pointer RP. For this purpose, a synchronization circuit 208 can also be envisioned, configured for synchronizing the read pointer RP with the clock signal of the circuit 200, i.e., with the clock signal CLK_RX. For instance, said circuit 208 can be provided via a cascade of two or more flip-flops. In particular, this synchronization circuit ensures that the circuit 200, in particular the circuit 202, uses valid versions of the write pointer WP, i.e., the operation of the circuit 202 is actually based on a synchronized version of the write pointer WP.

As mentioned previously, the circuit 200 is also responsible for managing control signals of the synchronized communication with circuit 2. For example, the circuit 200 can be configured for changing the logic value of the signal REQ simultaneously with incrementing the read pointer RP, i.e., when new data are available in the FIFO memory 18. Instead, the signal REQ can be reset when a change is detected in the signal ACK that acknowledges reading of the data DATA. In particular, in the embodiment considered, all the operations of block 200 are performed synchronously, i.e., in response to clock signals CLK_RX.

Purely by way of illustration, the multiplexers and de-multiplexers of the FIFO memory 18 are shown also in FIG. 4.

In particular, in the embodiment considered, the FIFO memory 18 comprises a de-multiplexer 182 configured for forwarding the current encoded data ADATA to the memory location selected via the write pointer WP. It is not required that the relation between the value of the write pointer WP and the memory location be a linear function, but it is sufficient to assign a specific memory location to each value of the pointer WP. For example, the de-multiplexer 182 could also take into account the encoding of the write pointer WP.

In a substantially similar way, the FIFO memory 18 comprises also a multiplexer 184, configured for forwarding the contents ADATA' of the memory location currently selected via the read pointer RP to the circuit 12 and consequently to the synchronous circuit 4.

Consequently, when the interface system 10 is initialized, the FIFO memory 18 is empty and the read pointer value RP initially corresponds to the value of the read pointer WP.

Next, when the bus ADATA contains new data, the circuit 204 changes the logical value of the signal 204a, for example the circuit 204 can change the logical value of the signal 204a from '0' to '1'. Such change drives both the writing of the data on the bus ADATA to the FIFO memory 18 and incrementing of the write pointer WP. For example, in the embodiment considered, said signal 204a is used as a clock signal for the writing interface of the FIFO memory 18 and the circuit 206, i.e., the writing of data ADATA to FIFO memory 18 and incrementing of the write pointer WP are carried out with the rising edge of the signal 204a.

In addition, as mentioned previously, the signal 204a can also be used for generating the read-acknowledge signal AACK. Consequently, when the signal on the bus ADATA is reset, the logic value of the AACK signal also changes automatically to signal that new data can be received.

Once the data ADATA are written in the FIFO memory 18, such data are immediately available at output of the FIFO memory, because the read pointer value RP corresponds initially to the memory location in which the first data were written. Consequently, the data at output of the FIFO memory 18, i.e., the encoded data ADATA', are immediately decoded via circuit 12 and forwarded to the synchronous circuit 2, i.e., on the bus DATA.

Once the write pointer WP has gone through the synchronization chain 208, the circuit 200 is able to determine if data have been written in the FIFO memory 18 and the circuit 200 changes the logic value of the signal REQ to indicate that new data are available.

Next, when a change is detected in the logic value of the signal ACK indicating that the synchronous circuit 10 has received the data via the line DATA, the read pointer RP is incremented and, if the next memory location is empty, the signal REQ is reset again.

The solution described previously does not comprise a mechanism for signaling to the asynchronous circuit 4 the fact that no further data can be received, for example because the FIFO memory 18 is full.

Figure 5:
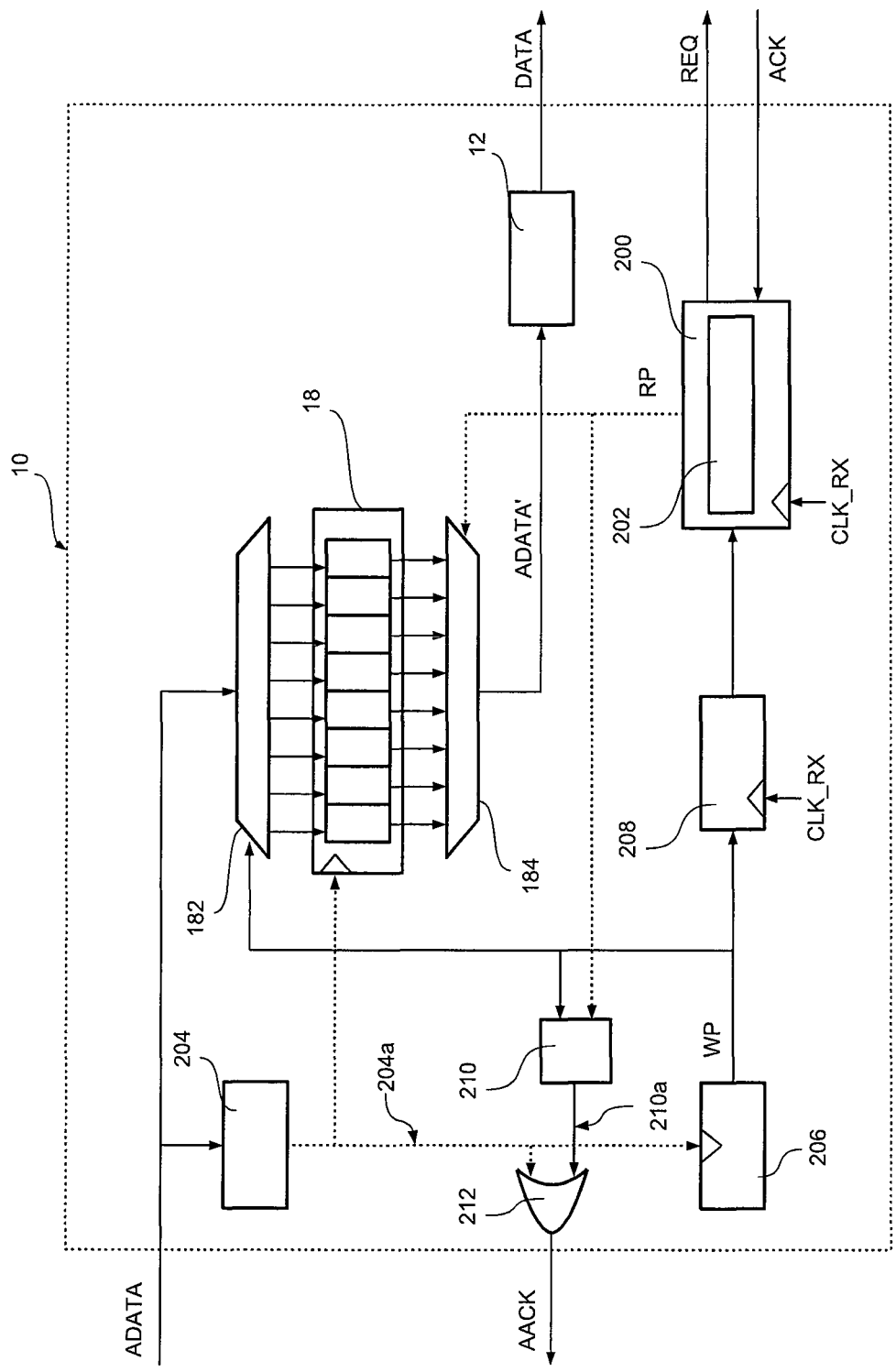

FIG. 5 shows instead an embodiment in which the system 10 comprises also means for determining the signal AACK as a function of the state of FIFO memory 54.

In particular, in the embodiment considered, the system 10 comprises means 210 configured for generating a signal 210a indicating that the FIFO memory 18 is full or that there is at least one more free memory location. For example, in the embodiment considered, a comparator 210 is used, configured for comparing the write pointer WP with the read pointer RP.

Consequently, a simple logic port 212 can be used to determine the logic value of the signal AACK as a function of the signals 204a and 210a. For example, for the logic levels described previously for signals 204a and 210a, an OR port 212 can be used.

Consequently, when data are written in the FIFO memory, the logic value of signal 204a is set to '1', i.e., the logic value of the signal AACK is set to '1' independently of the state of the FIFO memory 18. Next, in the case in which FIFO memory 18 becomes full, also the logic value of the signal 210a is set to '1'. Therefore, also when the signals on the bus ADATA are reset and the logic value of signal 204a is set again to '0', the logic value of signal AACK remains set to '1' until the data in FIFO memory 18 are read.

The solution described previously also has the advantage that possible glitches are avoided on the line AACK, which is fundamental to guaranteeing proper functioning of the asynchronous circuit 4. In fact, the circuit shown in FIG. 5 guarantees that only the value of the read pointer RP can change when the signal 210a is set to '1', because the asynchronous communication with circuit 4 is disabled.

Thus, the solution described herein maximizes the transfer of data between a synchronous circuit 2 and an asynchronous circuit 4.

Moreover, the solution is self-adjusting and is insensitive to possible variations caused by tolerances or different production processes. For that reason, the solution is adapted also to implementation with said "standard-cells", which allow shorter design and production times.

Finally, the solution can be used for any combination of two-phase synchronous protocols and four-phase asynchronous protocols.

Of course, without prejudice to the principle of the invention, the details of implementation and the embodiments may vary widely with respect to what is described and illustrated herein purely by way of example, without thereby departing from the scope of the present invention, as defined in the ensuing claims.

We claim:

1. An interface system for interfacing a synchronous circuit generating a first data signal with an asynchronous circuit generating an encoded second data signal according to an asynchronous communication protocol, said synchronous circuit sampling in response to a clock signal, the encoded second data signal when a first control signal indicates that said encoded second data signal contains valid data, the system comprising:
 a first-in first-out (FIFO) memory;
 a control circuit configured to asynchronously write said encoded second data signal in said FIFO memory when said encoded second data signal indicates a start of communications, and
 synchronously read said encoded second data signal from said FIFO memory in response to said clock signal;
 a conversion circuit configured to decode, according to said asynchronous communication protocol, said encoded second data signal read from said FIFO memory into a decoded data signal, said decoded data signal corresponding to data in the first data signal,
 said FIFO memory comprising
  a plurality of memory locations,
  an input de-multiplexer having an input configured to receive a write pointer, and
  an output multiplexer configured to receive a read pointer; and
 a comparator configured to compare the write pointer with the read pointer to generate an acknowledgement signal, the acknowledgement signal for disabling communication with the asynchronous circuit so that only the read pointer changes and indicating that either the encoded second data signal has been successfully sampled or that said FIFO memory is full, thereby avoiding glitches in sampling the encoded second data signal.

2. The interface system of claim 1, wherein said control circuit comprises a detection circuit configured to generate a second control signal as a function of said encoded second data signal; and wherein said detection circuit is configured to set said second control signal to a first logic value when said encoded second data signal indicates the start of communications, and to a second logic value, when said encoded second data signal indicates an end of communications.

3. The interface system of claim 1, wherein said control circuit comprises a first counter configured to manage the write pointer indicating a FIFO memory location in said FIFO memory in which said encoded second data signal is written;

and wherein said first counter is configured to increase said write pointer when said encoded second data signal indicates the start of communications.

4. The interface system of claim 3, wherein said control circuit comprises a second counter configured to manage the read pointer indicating a memory location in said FIFO memory from which said encoded second data signal is read; and wherein said second counter is configured to synchronously increment said read pointer in response to said clock signal.

5. The interface system of claim 4, wherein said second counter is configured to increment said read pointer when said write pointer and said read pointer indicate that new data is available in said FIFO memory.

6. An integrated circuit comprising:
a synchronous circuit configured to generate a first data signal;
an asynchronous circuit configured to generate an encoded second data signal according to an asynchronous communication protocol; and
an interface system configured to interface said synchronous circuit with said asynchronous circuit;
said synchronous circuit configured to sample, in response to a clock signal, the encoded second data signal when a first control signal indicates that said encoded second data signal contains valid data, the interface system comprising
a first-in first-out (FIFO) memory,
a control circuit configured to
asynchronously write said encoded second data signal in said FIFO memory when said encoded second data signal indicates a start of communications, and
synchronously read said encoded second data signal from said FIFO memory in response to said clock signal,
a conversion circuit configured to decode, according to said asynchronous communication protocol, said encoded second data signal read from said FIFO memory into a decoded data signal, said decoded data signal corresponding to data in the first data signal,
said FIFO memory comprising
a plurality of memory locations,
an input de-multiplexer having an input configured to receive a write pointer, and
an output multiplexer configured to receive a read pointer, and
a comparator configured to compare the write pointer with the read pointer to generate an acknowledgement signal, the acknowledgement signal for disabling communication with the asynchronous circuit so that only the read pointer changes and indicating that either the encoded second data signal has been successfully sampled or that said FIFO memory is full, thereby avoiding glitches in sampling the encoded second data signal.

7. The integrated circuit of claim 6, wherein said control circuit comprises a detection circuit configured to generate a second control signal as a function of said encoded second data signal; and wherein said detection circuit is configured to set said second control signal to a first logic value when said encoded second data signal indicates the start of communications, and to a second logic value, when said encoded second data signal indicates an end of communications.

8. The integrated circuit of claim 6, wherein said control circuit comprises a first counter configured to manage the write pointer indicating a FIFO memory location in said FIFO memory in which said encoded second data signal is written; and wherein said first counter is configured to increase said write pointer when said encoded second data signal indicates the start of communications.

9. The integrated circuit of claim 8, wherein said control circuit comprises a second counter configured to manage the read pointer indicating a memory location in said FIFO memory from which said encoded second data signal is read; and wherein said second counter is configured to synchronously increment said read pointer in response to said clock signal.

10. The integrated circuit of claim 9, wherein said second counter is configured to increment said read pointer when said write pointer and said read pointer indicate that new data is available in said FIFO memory.

11. A method for operating an interface system for interfacing a synchronous circuit generating a first data signal with an asynchronous circuit generating an encoded second data signal according to an asynchronous communication protocol, the synchronous circuit sampling in response to a clock signal, the encoded second data signal when a first control signal indicates that the encoded second data signal contains valid data, the method comprising:
operating a control circuit to asynchronously write the encoded second data signal in a first-in first-out (FIFO) memory when the encoded second data signal indicates a start of communications, and synchronously read the encoded second data signal from the FIFO memory in response to the clock signal;
operating a conversion circuit to decode, according to the asynchronous communication protocol, the encoded second data signal read from the FIFO memory into a decoded data signal, the encoded decoded data signal corresponding to data in the tee first data signal,
the FIFO memory comprising
a plurality of memory locations,
an input de-multiplexer having an input to receive a write pointer, and
an output multiplexer to receive a read pointer; and
operating a comparator to compare the write pointer with the read pointer to generate an acknowledgement signal, the acknowledgement signal for disabling communication with the asynchronous circuit so that only the read pointer changes and indicating that either the encoded second data signal has been successfully sampled or that the FIFO memory is full, thereby avoiding glitches in sampling the encoded second data signal.

12. The method of claim 11, further comprising operating a detection circuit in the control circuit to generate a second control signal as a function of the encoded second data signal; and wherein the detection circuit to sets the second control signal to a first logic value when the encoded second data signal indicates the start of communications, and to a second logic value, when the encoded second data signal indicates an end of communications.

13. The method of claim 11, further comprising operating a first counter in the control circuit to manage the write pointer indicating a FIFO memory location in the FIFO memory in which the encoded second data signal is written; and wherein the first counter increases the write pointer when the encoded second data signal indicates the start of communications.

14. The method of claim 13, further comprising operating a second counter in the control circuit to manage the read pointer indicating a memory location in the FIFO memory from which the encoded second data signal is read; and wherein the second counter synchronously increments the read pointer in response to the clock signal.

15. The method of claim 14, wherein the second counter increments the read pointer when the write pointer and the read pointer indicate that new data is available in the FIFO memory.

\* \* \* \* \*

UNITED STATES PATENT AND TRADEMARK OFFICE
CERTIFICATE OF CORRECTION

PATENT NO. : 9,026,761 B2  
APPLICATION NO. : 13/324838  
DATED : May 5, 2015  
INVENTOR(S) : Mangano et al.

Page 1 of 1

It is certified that error appears in the above-identified patent and that said Letters Patent is hereby corrected as shown below:

In the claims,

Column 10, Line 34    Delete: "encoded"

Column 10, Line 35    Delete: "tee"

Column 10, Line 52    Delete: "circuit to sets"
                      Insert: --circuit sets--

Signed and Sealed this
Seventeenth Day of November, 2015

Michelle K. Lee
*Director of the United States Patent and Trademark Office*